United States Patent [19]

Cassidy et al.

[11] Patent Number: 4,461,630

[45] Date of Patent: Jul. 24, 1984

[54] PRODUCT RECOVERY IN PRESSURE SWING ADSORPTION PROCESS AND SYSTEM

[75] Inventors: Robert T. Cassidy, Waldwick, N.J.; Kishore J. Doshi, Mahopac, N.Y.

[73] Assignee: Union Carbide Corporation, Danbury, Conn.

[21] Appl. No.: 430,369

[22] Filed: Sep. 30, 1982

[51] Int. Cl.³ .............................................. B01D 53/04
[52] U.S. Cl. ........................................ 55/25; 55/58; 55/62; 55/75; 55/179; 55/389
[58] Field of Search ................... 55/25, 26, 58, 62, 66, 55/68, 74, 75, 179, 389

[56] References Cited

U.S. PATENT DOCUMENTS

| | | | |
|---|---|---|---|
| 2,944,627 | 7/1960 | Skarstrom | 55/62 X |
| 3,069,830 | 12/1962 | Skarstrom et al. | 55/62 X |
| 3,142,547 | 7/1964 | Marsh et al. | 55/62 X |
| 3,176,444 | 4/1965 | Kiyonaga | 55/62 X |
| 3,338,030 | 8/1967 | Feldbauer, Jr. | 55/62 X |
| 3,430,418 | 3/1969 | Wagner | 55/62 X |
| 3,564,816 | 2/1971 | Batta | 55/62 X |
| 3,636,679 | 1/1972 | Batta | 55/62 X |
| 3,738,087 | 6/1973 | McCombs | 55/62 X |
| 3,788,036 | 1/1974 | Lee et al. | 55/62 X |
| 3,986,849 | 10/1976 | Fuderer et al. | 55/25 |
| 4,021,210 | 5/1977 | Streich et al. | 55/62 X |
| 4,077,780 | 3/1978 | Doshi | 55/66 X |
| 4,340,398 | 7/1982 | Doshi et al. | 55/74 X |
| 4,350,500 | 9/1982 | Esselink | 55/75 X |

FOREIGN PATENT DOCUMENTS 22603 1/1981 European Pat. Off. ............ 55/26

*Primary Examiner*—Robert H. Spitzer
*Attorney, Agent, or Firm*—Alvin H. Fritschler

[57] ABSTRACT

A portion of the void space gas released from an adsorbent bed during the cocurrent depressurization thereof, and to be used to provide purge gas, is passed directly to a bed to be purged. The remaining portion of such gas is passed simultaneously to an external surge drum. The gas in the external drum is thereafter passed to a bed to be purged.

20 Claims, No Drawings

PRODUCT RECOVERY IN PRESSURE SWING ADSORPTION PROCESS AND SYSTEM

BACKGROUND OF THE INVENTION

Field of the Invention

1. The invention relates to the purification of gases in a pressure swing adsorption system. More particularly, it relates to the improvement of product gas recovery in such a system.

2. Description of the Prior Art

The pressure swing adsorption (PSA) process provides a commercially desirable technique for separating and purifying at least one gas component from a feed gas mixture of said gas component and at least one selectively adsorbable component. Adsorption occurs in an adsorbent bed at a higher adsorption pressure, with the selectively adsorbable component thereafter being desorbed by pressure reduction to a lower desorption pressure. The PSA process is commonly employed in multi-bed systems as is indicated by the Wagner patent, U.S. Pat. No. 3,430,418, relating to a system having at least four beds, and by the Fuderer, et al. patent, U.S. Pat. No. 3,986,849, which discloses the use of at least seven adsorbent beds. As is generally known and described in these patents, the PSA process is commonly carried out, on a cyclic basis, in a processing sequence that includes, in each bed, higher pressure adsorption with the release of product effluent from the product end of each bed, cocurrent depressurization to intermediate pressure with release of void space gas from the product end of the bed, countercurrent depressurization to a lower desorption pressure, purge and repressurization. The void space gas released during the cocurrent depressurization step is commonly employed for pressure equalization purposes and to provide purge gas to a bed at its lower desorption pressure.

Multi-bed systems have the inherent advantage of greater productivity coupled with a substantially uniform flow of product effluent therefrom. The necessary cycling of the processing sequence from one bed to another is recognized, however, as creating conditions that somewhat limit the recovery of product from such systems. Such effects become more pronounced as the number of beds and the productivity requirements of a PSA system are increased, resulting in a potential increase in the amount of product gas unrecovered from each bed and subsequently lost upon countercurrent depressurization and purge. Such a loss of product gas, while tolerable in light of the overall objects of particular commercial applications of the PSA process and system, is nevertheless undesired.

One such condition tending to lower product recovery is that limitation on the amount of time available for purging each bed prior to the commencing of repressurization in that bed. When the purge time is relatively short, the purge gas must be passed through the bed under relatively high pressure drop conditions in order to adequately purge the bed within such limited available time. While the desired level of product purity can be maintained under such conditions, a relatively high pressure drop is disadvantageous with respect to product recovery, as more desired product is withdrawn from the system with the purge effluent under such circumstances. Such a limitation on product recovery is, of course, undesired in the art.

It is an object of the invention, therefore, to provide an improved PSA process and system.

It is another object of the invention to provide a PSA process and system having improved product recovery.

It is a further object of the invention to provide a PSA process and system capable of enhancing the time available for purge purposes during each processing cycle.

With these and other objects in mind, the invention is hereinafter described in detail, the novel features thereof being particularly pointed out in the appended claims.

SUMMARY OF THE INVENTION

The PSA process and system of the invention are employed so that the void space gas released from each bed during cocurrent depressurization and employed for purge purposes is used partly for passage directly to another bed for such purge purposes and partly for passage to an external surge drum. The gas thus passed to the surge drum is thereafter used to provide purge gas to a bed to be purged. In some embodiments, a portion of the thus released void space gas is passed to one end of the surge drum while additional void space gas is simultaneously being withdrawn from the other end of said drum to provide purge gas to a bed to be purged and while the remaining portion of said void space gas is used for direct pressure equalization purposes. The cocurrent depressurization, provide-purge step can thereby be made shorter so that a relatively longer purge step can be employed in each bed, contributing to enhanced product recovery from each bed and from the overall PSA System.

DETAILED DESCRIPTION OF THE INVENTION

The objects of the invention are accomplished by achieving a relatively short cocurrent depressurization, provide-purge step time and a relatively long purge step time during the processing cycle in each bed. Product recovery is thereby enhanced by avoiding the relatively high pressure drop conditions associated with a relatively short purge step as occurs in the well known, conventional PSA processing cycle.

The PSA process and system of the invention relates to such conventional PSA technology in which, as noted above, each adsorbent bed of the system undergoes on a cyclic basis, higher pressure adsorption, cocurrent depressurization to intermediate pressure levels with release of void space gas from the product end of the bed, with the bed being first cocurrently depressurized from high adsorption pressure to upper intermediate pressure with passage of released void space gas directly to another bed initially at lower pressure and being partially repressurized to said upper intermediate pressure by pressure equalization between the beds, and with the bed being further cocurrently depressurized from upper intermediate pressure to lower intermediate pressure with passage of released void space gas directly to another bed at its lower desorption pressure to provide purge gas to said other bed being depressurized at said lower desorption pressure countercurrent depressurization to a lower desorption pressure with the release of desorbed gas from the feed end of the bed, purge at lower desorption pressure partial repressurization from lower desorption pressure to upper intermediate pressure by pressure equalization with a bed initially at higher adsorption pressure, and final repressurization to said higher adsorption pressure. As is disclosed in the patents referred to above, a portion of the void space gas released from one bed during its cocurrent depressurization is commonly passed, directly or through external storage tanks, to a bed or beds initially at lower pressure to equalize the pressure between said beds, i.e., in one or more pressure equalization steps. Another portion of said void space gas is used to provide purge to a bed undergoing the purge step. For this purpose, the released void space gas can advantageously be passed directly from the bed undergoing cocurrent depressurization to the bed being purged. Alternatively, the prior art has employed systems in which said released void space gas is passed, not directly to another bed, but to an external storage tank for passage therefrom to the bed to be purged, typically at an economic penalty vis-a-vis direct pressure equalization systems.

In the practice of the invention, a portion of the released void space gas that is to be used for purge purposes is introduced as in the patents referred to above, directly into an adsorbent bed that is to be purged at that point in the processing cycle of the overall PSA system. The remaining portion of released void space gas, however, is simultaneously introduced into an external surge drum. Such gas is thereafter passed from the surge drum, as purge gas, to an adsorbent bed to be purged. By carrying out the cocurrent depressurization, provide-purge step in each bed in this manner, it is found that highly advantageous processing cycles can be employed in which the cocurrent depressurization, provide-purge step in each bed is significantly shortened in time as compared with the purge time in that bed. The resulting relatively short provide-purge time/long purge time in each bed enhances product recovery in each bed and in the overall adsorption system.

The invention can advantageously be practiced in multi-bed PSA systems having at least four adsorbent beds therein, preferably in systems having from five to ten adsorbent beds, although the invention can also be used in systems having a larger number of beds. It will be understood that, in such multi-bed systems, the feed gas may be passed to more than one bed at any particular stage of the processing cycle. Thus, the feed gas is often passed to at least two beds at any given time in the operation of such multi-bed systems. As indicated above with respect to conventional practice and the practice of the invention, the PSA process desirably employs, in multi-bed operations, one, two, three or more pressure equalization steps in which cocurrent depressurization gas released from one bed at an elevated pressure is used to partially repressurize another bed initially at lower pressure. Thus, the invention can be used in processing cycles such as, for example, those involving five adsorbent beds, with two on adsorption at any time, and one pressure equalization step, those involving six adsorbent beds with two on adsorption at any time, and two pressure equalization steps, and those involving eight adsorbent beds, with two on adsorption at any time and three pressure equalization steps. Those skilled in the art will appreciate that various other PSA processes and systems can be adapted so as to take advantage of the desirable benefits of the invention.

The practice of the invention can be illustrated by the Table below with respect to a five bed embodiment to the invention.

TABLE

| Bed No. | Cycle (521) E | | | | | |
|---|---|---|---|---|---|---|
| 1 | A | | | /E D | P | /R |
| 2 | /R | | A | | /E D | P |
| 3 | P | /R | | | | /E D |
| 4 | /E D | P | | /R | A | |
| 5 | A | /E D | P | /R | | A |

In this Table, A represents an adsorption step at a high adsorption pressure, 1 represents a cocurrent depressurization pressure equalization step between a bed that has completed its adsorption step and a bed that has been purged at lower desorption pressure, E represents a cocurrent depressurization, provide-purge step of the invention in which a portion of the void space gas released from a bed is passed directly to another bed undergoing its purge step and the remaining portion of said gas is simultaneously introduced into an external surge drum, D represents a countercurrent depressurization step, P represents a purge step at lower desorption pressure, and R represents repressurizaton to higher adsorption pressure. In the process of the illustrated example, it will be seen that two of the five beds are on their adsorption step, in overlapping sequence, at any given time in the cycle. As one pressure equalization step is employed, the overall cycle is referred to in the heading as (521)E, the five representing the number of beds, the two representing the number of beds on adsorption, the one representing the one pressure equalizaton step, and E denoting the point of novelty of the invention wherein cocurrent depressurization, provide-purge gas passes directly from one bed to another and simultaneously to an external surge drum. The six and eight bed systems specifically referred to above would thus similarly be referred to as having (622)E and (823)E cycles, respectively.

In the processing cycle illustrated in the cycle, the cocurrent depressurization, provide-purge step of bed 1 involves passing released void space gas directly from the product end of bed 1 to the product end of bed 5 to provide purge gas for said bed 5, which is on its purge step following step D. At the same time, released void space gas from bed 1 is introduced into an external surge drum. During countercurrent depressurization step D in bed 1, void space gas is passed from the external surge drum to bed 5 for purge purposes. After countercurrent depressurization step D in bed 1, void space gas is passed from the external surge drum back to bed 1 for purge purposes. In the illustrated embodiment, such external purge gas is used for an initial portion of the purge of bed 1, after which cocurrent depressurization, provide-purge gas from bed 2 is used directly for further purging of bed 1, with additional purge gas from the external purge drum thereafter being used to complete the purge of bed 1. The cocurrent depressurization, provide-purge gas from bed 1 is thus used for direct purge of bed 5, said purge gas from bed 2 is used to direct purge bed 1, said purge gas from bed 3 is used to direct purge bed 2, said purge gas from bed 4 is used to direct purge bed 3 and said purge gas from bed 5 is used to direct purge bed 4. In each instance in accordance with the practice of the invention, cocurrent depressurization, provide-purge gas from each bed is also simultaneously passed to an external surge tank from which said gas is thereafter passed back to a bed being purged, prior and subsequent to the passage of purge gas directly to that bed from another bed as described above.

The illustrated (521)E embodiment of the invention allows the desirable use of a longer purge time, with a smaller pressure drop, for each bed, as compared with a conventional cycle involving the providing of purge gas directly from one bed to another, within the limits of a given allowable or desirable overall cycle time. In conventional practice, on the other hand, the providing of such a longer purge time for each bed would normally also require a longer adsorption time and a longer overall processing time, diminishing the productive capacity of the system.

Those skilled in the art will appreciate that the use of an external equalization feature for providing purge enables the invention to be employed with some adsorption or impurities front breakthrough from each bed, whereas in the conventional practice involving only the providing of purge gas from one bed directly to another, the cocurrent depressurization, provide-purge step is normally terminated while the impurities front remains in the bed. This feature enables smaller adsorption beds to be employed, but, in turn, requires the use of a larger surge drum. In this regard, it should be noted that the external surge drum into which released void space gas is passed can be an empty drum in which gas can freely and turbulently mix or, alternatively, can comprise an extended tube, e.g., a U-tube configuration, or other storage unit into which such gas can be passed quiescently so as to avoid a turbulent mixing of the gas that initially entered the vessel with the gas that enters said vessel toward the end of the passage of released void space gas to said vessel. Operating in this so-called plug-flow manner, the impurity profile of the gas can be maintained so that, upon subsequent use of said gas to provide purge to an adsorbent bed, the gas can be withdrawn from the external vessel in a manner such that the least pure gas can initially be introduced into the bed followed by the purer gas to enhance the effectiveness of the purging stop using said gas from the external surge vessel or drum.

It has been surprisingly discovered that the invention, employing a combination of direct and indirect provide purge steps, enables cost and performance advantages to be achieved comparable to those obtainable with the highly desirable process and system of the Fuderer et al. patent referred to above. Thus, the (823)E embodiment of the invention, referred to above, employs an eight bed system having costs and performance characteristics essentially equivalent to those obtainable in a ten bed Fuderer et al. system. Similar to the (521)E embodiment, the (622)E embodiment involves use of the cocurrent depressurization, provide-purge step to provide purge gas to the external surge drum simultaneously with the passage of such provide purge gas directly from bed 1 to bed 6, from bed 2 to bed 1, from bed 3 to bed 2, etc. It will be appreciated that particular processing variations may be incorporated into any embodiment of the invention. A particularly desirable (622)E embodiment, for example, includes a delay period between the first and second cocurrent depressurization, provide-purge steps in the processing cycle of each bed. The (622)E embodiment of the invention is found to have desirably lower cost and higher recovery than pertains to a conventional (622) system.

In the practice of the invention, the (832)E embodiment of the invention is capable of providing a 50% longer purge time than in the corresponding (832) system, not employing the particular provide purge feature of the invention but also utilizing eight beds, three beds on adsorption at any time, and two cocurrent depressurization-pressure equalization steps. Thus, the (832) process and system can be employed using a cocurrent depressurization, provide-purge time of 90 seconds, and a purge time of also 90 seconds in each bed. By modifying the process and system to an (832)E embodiment of the invention, the cocurrent depressurization-provide time can be reduced to 45 seconds, and the purge time can be extended to 135 seconds within the limits of an essentially unchanged overall cycle time. This example of a cycle having a 50% longer purge time than in a comparable conventional cycle illustrates the practical and highly significant advantage obtainable by the use of the invention. The external surge drum required for the (832)E embodiment of the invention is relatively small, being only 30% of the volume of one adsorbent bed. The (832)E embodiment is one of the most efficient PSA cycles having a well balanced time distribution, providing for a more uniform pressure profile in the external surge drum.

Those skilled in the art will appreciate that various other changes and modifications can be made in the details of the PSA process and system without departing from the scope of the invention as recited in the appended claims. Thus, while the invention has been described in particular with reference to five, six and eight bed systems, it will be appreciated that other systems having seven beds or more than eight bed systems can be employed, but that various PSA processing features can be incorporated with any particular cycle or system incorporating the particular provide purge invention herein disclosed and claimed. While the void space gas passed to the external drum may be passed back to the same bed from which it was released, as in the various embodiments referred to above, it will be appreciated that it is within the scope of the invention to pass void space gas released from the external drum or vessel to a different bed than the one from which said void space gas was released. It is also within the scope of the invention to pass void space gas from the external drum to provide purge gas for one bed, while void space gas from another bed is simultaneously being passed to the external drum.

While it is not essential for purposes of obtaining benefits from the invention, it is generally preferred that the cocurrent depressurization, provide-purge time for each bed be less than about half of the purge time for said bed, as set forth in the illustrative example with respect to the (823)E embodiment of the invention. In applying the invention generally, it will readily be appreciated that PSA systems necessarily incorporate various conduits, valves and other control features to accomplish the necessary switching of the adsorbent beds from one processing step to the next in appropriate sequence. The invention employs conventional conduits and control features well known in the art, as indicated by reference to the patents referred to above. For purposes of the invention, it will be understood that the external surge drum is employed together with means, i.e. conduits and suitable conventional controls, for passing a portion of the void space released during the cocurrent depressurization, provide-purge step to said external surge drum simultaneously with the introduction of the remaining portion of said released void space gas directly into a bed to be purged through conventional conduit means. Means are similarly provided for passing void space gas from said drum to a bed to be purged, for passing feed gas to two or more adsorbent beds at all stages of the processing cycle, to enable purge gas to be passed from the external drum, when desired, at the same time void space gas is being passed to the drum, and to accomplish other desired aspects of particular embodiments falling within the scope of the invention.

The pressure swing adsorption process and system herein disclosed and claimed can be advantageously employed to selectively adsorb at least one component of a feed gas mixture, thereby separating and purifying a desired product effluent gas. For example, the invention can be used to advantage in separating and purifying hydrogen present as a major component of a feed gas mixture also containing carbon dioxide as a selectively adsorbable component, commonly together with one or more additional minor components to be removed as undesired impurities, such as nitrogen, argon, carbon monoxide, light saturated and unsaturated hydrocarbons, aromatics, light sulfur compounds and the like. Those skilled in the art will appreciate that the invention can also be advantageously employed for other desirable separations in which at least one component of a feed gas mixture is selectively adsorbed in an adsorption system of the type herein described. The separation and purification of oxygen from air, and methane purification from mixtures thereof with carbon dioxide, ammonia, hydrogen sulfide and the like, or from other heavier hydrocarbon gases, are examples of other applications of the invention. It should be noted that the PSA process in general, and the invention in particular, can be carried out using any suitable adsorbent material having a selectivity for one component of a feed gas mixture over another, as for the impurity over the desired product gas. Suitable adsorbents include zeolitic molecular sieves, activated carbon, silica gel, activated alumina and the like. Zeolitic molecular sieve adsorbents are generally desirable in the separation and purification of hydrogen contained in mixtures thereof with carbon dioxide, nitrogen and the like. Further information concerning suitable adsorbents, including such zeolitic molecular sieves is contained in the Kiyonaga patent U.S. Pat. No. 3,176,444, and various other patents such as those referred to above.

As was indicated above, various changes and modifications can be made in the PSA process and system to which the invention is directed without departing from the scope of the invention as herein disclosed and claimed. Thus, the manner in which the pressure equalization steps are carried out, i.e., either directly or indirectly through external equalization vessels, the number of such equalizations, the manner in which repressurization to higher adsorption pressure, i.e., by feed gas or by a portion of the product effluent from the system, is not critical to the invention or to the obtaining of the benefits therefrom. In this regard, it should also be noted that, while the purge step has been described herein as occurring at the lower desorption pressure, those skilled in the art will appreciate that the purge step can be carried out at a pressure above said lower desorption pressure, although it is more commonly carried out after countercurrent depressurization to a lower desorption pressure.

The relatively short provide-purge time/long purge time achieved by the practice of the invention enhances product recovery and overall efficiency in multi-bed processes and systems. Product recovery is enhanced for several reasons, namely (1) the shorter provide-purge time, longer purge time results in a lower pressure drop during the purge step, thereby increasing recovery as discussed above, (2) the smaller bed size, permitted since some impurities breakthrough from each bed is allowed due to the mixing in the external surge drum, resulting in higher recovery, and (3) the shorter provide-purge time increases gas velocity during that step which, in turn, increases mass diffusion rates from the gas phase to the solid phase, resulting in sharper mass transfer fronts and, hence higher recovery. In addition, the external surge drum can also allow for an additional, i.e. indirect, pressure equalization within a given cycle time, which can result in higher recovery at a given cost, or a lower cost at a given recovery. The cost of the overall system is reduced in the practice of the invention since the system can be operated at a shorter adsorption time, which would reduce the size of the adsorption beds. It will be understood also that, in the advantageous practice of the invention, the provide-purge step is no longer linked with the purge step as in conventional practice. Thus, the provide-purge step in one bed does not have to be lined up with a bed that is being purged at the same time interval in the overall processing cycle. This introduces a desirable flexibility in the control and operation of the PSA system. It should also be noted, as part of the overall flexibility of the invention, that the gas released from a bed during the provide-purge step may be passed to more than one other bed in the system, while simultaneously being passed to one or more external surge drums. Similarly, the gas withdrawn from the external surge drum may be passed to more than one bed being purged, and combinations of such features may be employed to pass void space gas, directly and indirectly, to more than one adsorbent bed at any given time. By enabling cost and performance characteristics of such processes and systems, with a lesser number of adsorbent beds, to compare favorably with those previously obtainable in the highly desirable practice of the process of the Fuderer et al. patent, the invention provides a highly desirable processing flexibility, contributing significantly to the development of the PSA technology in meeting the evolving requirements of industrial gas separation and purification operations.

We claim:

1. In a pressure swing adsorption process for the selective adsorption of at least one component of a feed gas mixture in an adsorption system having at least four adsorbent beds, each of which undergoes, on a cyclic basis, higher pressure adsorption, cocurrent depressurization from said higher adsorption pressure to upper intermediate pressure with release of void space gas from the product end of the bed for passage directly to another bed initially at lower pressure for pressure equalization therebetween at said upper intermediate pressure, further cocurrent depressurization from said upper intermediate pressure to lower intermediate pressure with release of void space gas from the product end of the bed for passage directly to another bed to provide purge gas to said other bed for the purge thereof at its lower desorption pressure, countercurrent depressurization from said lower intermediate pressure to said lower desorption pressure, purge at said lower desorption pressure with void space gas being passed directly from another bed being cocurrently depressurized from upper to lower intermediate pressure to said bed as purge gas for said purge at lower desorption pressure, partial repressurization from said lower desorption pressure to said upper intermediate pressure with the passage of void space gas from the product end of another bed initially at higher pressure for pressure equalization therebetween at said upper intermediate pressure, and final repressurization from upper intermediate pressure to said higher adsorption pressure, in which a portion of the void space gas released from one bed is passed to a bed(s) initially at a lower pressure to equalize the pressure therebetween and another portion thereof is used to provide purge gas for a bed undergoing said purge the improvement consisting essentially of:

(a) simultaneously with the passage of released void space gas from the product end of the bed directly to another bed to provide purge gas thereto upon further cocurrent depressurization of said bed from upper intermediate pressure to lower intermediate pressure introducing a portion of said released void space gas into an external purge drum; and (b) passing said void space gas introduced into said external drum during step (a) above from said external drum and introducing said void space gas into a bed to be purged at lower desorption pressure for the purging thereof at said lower desorption pressure, in addition to purge gas introduced to said bed directly from another bed, prior to partial repressurization thereof by pressure equalization and final repressurization to higher adsorption pressure, the total purge time in each bed being significantly greater than said step (a) time, whereby the relatively short provide-purge time/long purge time enhances product recovery in each bed and in the overall adsorption system.

2. The process of claim 1 in which the product gas withdrawn from the system comprises hydrogen and said selectively adsorbed component comprises carbon dioxide.

3. The process of claim 1 in which the feed gas mixture is passed, on a cyclic basis, to from five to ten adsorbent beds.

4. The process of claim 1 in which the void space gas passed from said external drum is passed to the same bed from which said gas was released, for purposes of purging said bed at its lower desorption pressure.

5. The process of claim 1 in which the void space gas released from said external drum is passed to a different bed than the one from which said void space gas was released.

6. The process of claim 1 in which void space gas is passed from said external drum to provide purge gas for one bed while void space gas from another bed is simultaneously being passed to said external drum.

7. The process of claim 4 in which cocurrent depressurization, provide-purge time for each bed is less than about half of the purge time for said bed.

8. The process of claim 7 in which the feed gas mixture is passed, on a cyclic basis, to from five to ten adsorbent beds.

9. The process of claim 8 in which the product gas withdrawn from the system comprises hydrogen and said selectively adsorbed component comprises carbon dioxide.

10. The process of claim 1 in which feed gas is passed to at least two adsorbent beds at all stages of the processing cycle.

11. The process of claim 1 in which the portion of the released void space gas being used to provide purge gas directly is passed to more than one bed for such direct purge purposes.

12. The process of claims 1 or 11 in which the void space gas passing from said external surge drum for indirect purge purposes is passed to more than one adsorbent bed.

13. In a pressure swing adsorption system having at least four adsorbent beds for the selective adsorption of at least one gas component from a feed gas mixture, said system having conduit means for, on a cyclic basis, passing feed gas to the system at higher adsorption pressure and for withdrawing product effluent from the system at said higher adsorption pressure and for passing void space gas released from the product end of each bed in the system upon cocurrent depressurization thereof directly to another bed initially at a lower pressure for pressure equalization therebetween at an upper intermediate pressure, and for passing additional void space gas released from the product end of said bed upon further cocurrent depressurization thereof to lower intermediate pressure directly to another bed at its lower desorption pressure to provide purge gas to said bed undergoing purge at said lower desorption pressure, for passing void space gas released from another bed initially at higher pressure to said bed at its lower desorption pressure for pressure equalization therebetween at said upper intermediate pressure and for passing gas to said partially repressurized bed for final repressurization thereof to higher adsorption pressure, the improvement consisting essentially of:

(a) an external purge drum;

(b) means for passing a portion of the void space gas released from said bed upon said further cocurrent depressurization from upper intermediate pressure to lower intermediate pressure to said external surge drum simultaneously with the introduction of the remaining portion of said released void space gas directly into a bed to be purged at its lower desorption pressure; and (c) means for passing void space gas from said external drum to a bed to be purged at said lower desorption pressure prior to partial repressurization thereof to upper intermediate pressure and final repressurization to higher adsorption pressure, the total purge time in each bed being significantly greater than the time employed for passing void space gas to said external drum by the means of element (b) above, whereby product recovery is enhanced by the relatively short provide-purge time/long purge time resulting in each bed of the adsorption system.

14. The system of claim 13 in which the adsorption system comprises from five to ten adsorbent beds.

15. The system of claim 13 in which said means for passing void gas from the drum to a bed to be purged is adapted to pass said gas to the same bed from which said gas was released, gas being passed to said bed for purposes of purge at a lower desorption pressure.

16. The system of claim 13 in which said means for passing void space gas from the drum to a bed to be purged is adapted to pass said gas to a different bed than the one from which said gas was released.

17. The system of claim 13 and including means for passing void space gas from said external drum to provide purge gas to one bed at the same time that void space gas is being passed to said external drum from another bed.

18. The system of claim 14 adapted to operate, on said cyclic basis, so as to follow a cocurrent depressurization, provide-purge time in each bed that is less than about half of the purge time for said bed.

19. The system of claim 13 and including means for passing feed gas to two or more adsorbent beds at all stages of the processing cycle in said system.

20. The system of claim 19 in which the adsorption system comprises from five to ten adsorbent beds.

* * * * *